Patented May 6, 1930

1,757,506

UNITED STATES PATENT OFFICE

JAMES BADDILEY, OF BLACKLEY, MANCHESTER, ENGLAND, ASSIGNOR TO BRITISH DYESTUFFS CORPORATION LIMITED, OF BLACKLEY, MANCHESTER, ENGLAND

MANUFACTURE OF NEW SECONDARY DISAZO DYES AND THEIR APPLICATION

No Drawing. Application filed May 3, 1929, Serial No. 360,314, and in Great Britain December 13, 1926.

In my copending application Serial No. 193,388 I have described a process for dyeing regenerated cellulose material directly with the secondary disazo dyestuffs obtained by combining the diazo compound obtained from a nitroaniline or a homologue or derivative thereof not containing a sulphonic or carboxylic acid group with any middle component, rediazotizing and combining with a periaminonaphthol sulphonic acid, including the N-substitution product of the latter in this term.

The present invention relates to a process for dyeing regenerated cellulose material with the dyes referred to above, consisting in reducing the nitro group of the dyestuffs so obtained with a suitable agent, for example, sodium sulphide, the reduced dyestuffs being using for dyeing. These reduced dyestuffs may be represented by the general formula

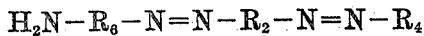

wherein $R_6$ represents a divalent benzene residue free from sulphonic or carboxylic groups, $R_2$ represents a divalent benzene or naphthalene residue and $R_4$ represents a coupled 1:8-aminonaphthol sulphonic acid.

I have found that the new dyestuffs generally possess the property of dyeing regenerated cellulose rayons such as viscose rayons, in level shades. In certain cases they may also be used for dyeing cotton, the dyeings being capable of diazotization and development on the fibre.

In the following directions, the parts are by weight:—

138 parts of para-nitroaniline are diazotized in the usual way and combined in mineral acid solution with 137 parts of meta-amino-para-cresol methyl ether at about 10° C. by stirring overnight. The mixture is then heated to about 30° C. and rediazotized by addition of a further amount of hydrochloric acid and 69 parts of sodium nitrite, the mixture throughout being acid to Congo red. When diazotization is complete, the diazo suspension is cooled with ice and added gradually to an ice-cold alkaline solution of 319 parts of 1:8-aminonaphthol-3:6-disulphonic acid containing sufficient caustic soda or sodium carbonate to maintain the mixture alkaline throughout the coupling. When combination is complete about 360 parts of sodium sulphide crystals are added and the mixture stirred overnight at room temperature, during which time the nitro group is completely reduced. The mixture is then heated up, made neutral to litmus by addition of hydrochloric acid and the dyestuff isolated by addition of common salt, filtered off and dried. It dyes viscose rayon a level greenish-black shade.

The dyestuffs obtained by this invention may be applied to fabrics of cotton or of regenerated artificial silks in the usual way. For example a dyebath may be made up from 6 parts of the dyestuff of one of the examples below and 3,000 parts of water. 100 parts of viscose silk are entered into the bath which is then heated to the boil. 30 parts of Glauber's salt or common salt are then added and the dyeing continued for ½ hour at or near the boil. Soap may be added to the dyebath if desired. The viscose silk is dyed a full black shade, which may be modified by diazotization on the fibre and development with, say, m-toluylenediamine, whereby the fastness to washing and to acids is increased.

Examples of dyes to which my invention is applicable are quoted in the following table:—

| | Secondary disazo colours from | | | Shade on viscose silk of the products reduced with sodium sulphide as described |
|---|---|---|---|---|
| | First component | Middle component | End component (coupled alkaline) | |
| | p-nitroaniline | p-xylidine | 1:8 aminonaphthol | Brownish-black |
| | Do. | m-toluidine | Do. | Brownish-black |
| | p-nitroaniline | meta-amino-p-cresol, methyl ether | 1-acetylamino-8-naphthol 3:6-d i s u l-phonic acid | Olive-black |
| | Do. | Do. | 1:8 - aminonaphthol - 2:4 - disulphonic acid | Black |
| | p-nitroaniline | naphthylamine | 1:8 - aminonaphthol - 3:6 - disulphonic acid | Olive-black |
| | m-nitroaniline | meta-amino para-cresol methyl ether | Do. | Brownish-black |
| | o-chloro-p-p-nitroaniline | Do. | Do. | Greenish-black |
| | Do. | Do. | 1:8-aminonaphthol-4-sulphonic acid | Grey-black |
| | m-nitro-p-toluidine | Do. | 1:8 - aminonaphthol - 3:6 - disulphonic acid | Black |
| | 4-nitro-o-anisidine | Do. | Do. | Black |
| | p-nitroaniline | 1-naphthylamine-6 and 7 sulphonic acids | 1:8-amino-naphthol-4-sulphonic acid | Dull blue |
| | p-nitroaniline | meta-amino-para-cresol methyl ether | 1:8 - aminonaphthol - 3:6 - disulphonic acid | Greenish-black |

What I claim and desire to secure by Letters Patent is:—

1. The process of dyeing regenerated cellulose material in level shades which comprises immersing the material in a bath containing a dye obtained by coupling a diazotized amine having the formula $$O_2N-R_6-NH_2$$

wherein $R_6$ represents a divalent benzene residue free from sulphonic and carboxylic groups with a middle component, having the formula $R_2-NH_2$ wherein $R_2$ represents a phenyl or naphthyl residue, rediazotizing, coupling with a sulphonated periaminonaphthol in alkaline solution, and reducing the nitro group.

2. Regenerated cellulose material dyed with dyes obtained by coupling a diazotized amine having the formula $O_2N-R_6-NH_2$ wherein $R_6$ represents a divalent benzene residue free from sulphonic and carboxylic groups, with a middle component having the formula $R_2-NH_2$ wherein $R_2$ represents a phenyl or naphthyl residue, rediazotizing, coupling with a sulphonated periamino naphthol in alkaline solution and reducing the nitro group.

3. The process of dyeing regenerated cellulose materials in even level shades which comprises applying to said regenerated cellulose material the secondary disazo dyes having the general formula $$H_2N-R_6-N=N-R_2-N=N-R_4$$

wherein $R_6$ represents a divalent benzene residue free from sulphonic or carboxylic groups, $R_2$ represents a divalent benzene or naphthalene residue and $R_4$ represents a coupled 1:8-aminonaphthol sulphonic acid.

4. The process of dyeing regenerated cellulose materials in even level shades which comprises applying to said regenerated cellulose material the secondary disazo dyes having the general formula $$H_2N-R_7-N=N-R_2-N=N-R_4$$

wherein $R_7$ represents a divalent benzene residue free from sulphonic or carboxylic groups, $R_2$ represents a divalent benzene or naphthalene residue and $R_4$ represents a coupled 1:8-aminonaphthol sulphonic acid and in which the $H_2N$ group is attached to the $R_7$ in the para position to the azo group.

5. The process of dyeing regenerated cellulose materials in even level shades which comprises applying to said regenerated cellulose material the secondary disazo dyes having the general formula $$H_2N-R_8-N=N-R_2-N=N-R_4$$

wherein $R_8$ represents a divalent benzene residue or the chloro, alkyl or alkoxy derivatives of such residue, the said residue represented by $R_8$ being free from sulphonic or carboxylic groups, $R_2$ represents a divalent benzene or naphthalene residue and $R_4$ represents a coupled 1:8-aminonaphthol sulphonic acid and in which the $H_2N$ group is attached to the $R_8$ in the para position to the azo group.

6. The process of dyeing regenerated cellulose materials in even level shades which comprises applying to said regenerated cellulose material the secondary disazo dyes having the general formula

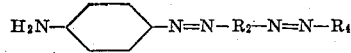

wherein $R_2$ represents a divalent benzene or naphthalene residue and $R_4$ represents a coupled 1:8-aminonaphthol sulphonic acid.

7. The process of dyeing regenerated cellulose materials in even level shades which comprises applying to said regenerated cellulose material the secondary disazo dyes having the general formula

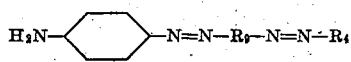

wherein $R_9$ represents a divalent alkyl substituted benzene residue and $R_4$ represents a coupled 1:8-aminonaphthol sulphonic acid.

8. The process of dyeing regenerated cellulose materials in even level shades which comprises applying to said regenerated cellulose material the secondary disazo dyes having the general formula

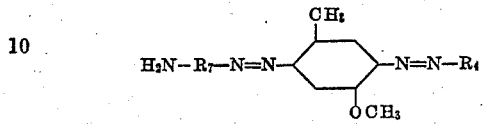

wherein $R_7$ represents a divalent benzene residue free from sulphonic or carboxylic groups and $R_4$ represents a coupled 1:8-aminonaphthol sulphonic acid and in which the $H_2N$ group is attached to the $R_7$ in the para position to the azo group.

9. The process of dyeing regenerated cellulose materials in even, level shades which comprises applying to said regenerated cellulose materials the secondary disazo dyes having the general formula

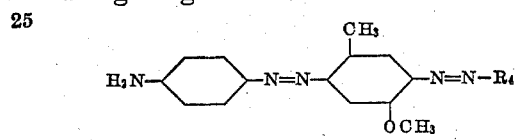

wherein $R_4$ represents a coupled 1:8-aminonaphthol sulphonic acid.

10. The process of dying regenerated cellulose materials in even, level shades which comprises applying to said regenerated cellulose material the secondary disazo dyes having the probable formula

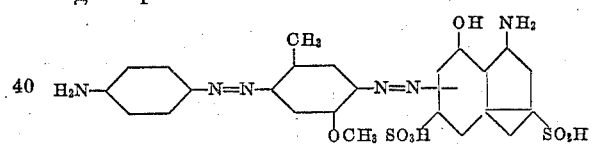

11. Regenerated cellulose materials dyed with the secondary disazo dyes having the general formula

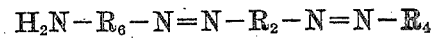

wherein $R_6$ represents a divalent benzene residue free from sulphonic or carboxylic groups, $R_2$ represents a divalent benzene or naphthalene residue and $R_4$ represents a coupled 1:8-aminonaphthol sulphonic acid, the said regenerated cellulose material having an even, level shade.

12. Regenerated cellulose materials dyed with the secondary disazo dyes having the general formula

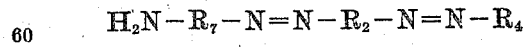

wherein $R_7$ represents a divalent benzene residue free from sulphonic or carboxylic groups, $R_2$ represents a divalent benzene or naphthalene residue and $R_4$ represents a coupled 1:8-aminonaphthol sulphonic acid and in which the $H_2N$ group is attached to the $R_7$ in the para position to the azo group, the said regenerated cellulose material having an even, level shade.

13. Regenerated cellulose materials dyed with the secondary disazo dyes having the general formula

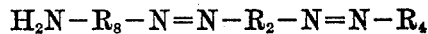

wherein $R_8$ represents a divalent benzene residue or the chloro, alkyl or alkoxy derivatives of such residue, the said residue represented by $R_8$ being free from sulphonic or carboxylic groups, $R_2$ represents a divalent benzene or naphthalene residue and $R_4$ represents a coupled 1:8-aminonaphthol sulphonic acid and in which the $H_2N$ group is attached to the $R_8$ in the para position to the azo group, the said regenerated cellulose material having an even, level shade.

14. Regenerated cellulose materials dyed with the secondary disazo dyes having the general formula

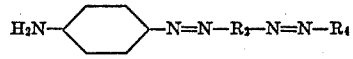

wherein $R_2$ represents a divalent benzene or naphthalene residue and $R_4$ represents a coupled 1:8-aminonaphthol sulphonic acid, the said regenerated cellulose materials having an even level shade.

15. Regenerated cellulose materials dyed with the secondary disazo dyes having the general formula

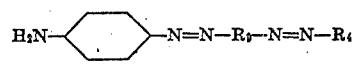

wherein $R_9$ represents a divalent alkyl substituted benzene residue and $R_4$ represents a coupled 1:8-aminonaphthol sulphonic acid, the said regenerated cellulose materials having an even level shade.

16. Regenerated cellulose materials dyed with the secondary disazo dyes having the general formula

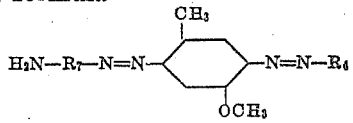

wherein $R_7$ represents a divalent benzene residue free from sulphonic or carboxylic groups and $R_4$ represents a coupled 1:8-aminonaphthol and sulphonic acid and in which the $H_2N$ group is attached to the $R_7$ in the para position to the azo group, the said regenerated cellulose materials having an even level shade.

17. Regenerated cellulose materials dyed with the secondary disazo dyes having the general formula

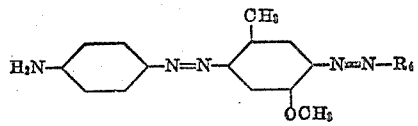

wherein $R_4$ represents a coupled 1:8-aminonaphthol sulphonic acid, the said regenerated cellulose materials having an even level shade.
18. Regenerated cellulose materials dyed with the secondary disazo dyes having the general formula
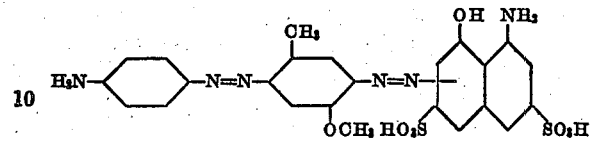
the said regenerated cellulose materials having an even level shade.
In witness whereof I affix my signature.
JAMES BADDILEY.